(12) United States Patent
Ishimori et al.

(10) Patent No.: US 6,454,041 B2
(45) Date of Patent: Sep. 24, 2002

(54) WORKING VEHICLE WITH A PTO APPARATUS

(75) Inventors: Shoso Ishimori, Sakai; Nobuyuki Yamashita, Izumi, both of (JP); Masatake Murakawa, Duluth, GA (US)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/789,483

(22) Filed: Feb. 20, 2001

(30) Foreign Application Priority Data

Jul. 25, 2000 (JP) ........................................ 2000-223761

(51) Int. Cl.⁷ .............................................. B60K 17/00
(52) U.S. Cl. ..................... 180/374; 180/312; 180/53.1; 56/13.5
(58) Field of Search ................................ 180/312, 53.1, 180/53.3, 294, 374, 377; 172/74, 79; 56/10.6, 13.5, 202

(56) References Cited

U.S. PATENT DOCUMENTS

| | | | | |
|---|---|---|---|---|
| 5,099,936 A | * | 3/1992 | Irikura et al. | 180/53.1 |
| 5,755,098 A | * | 5/1998 | Irikura | 60/435 |
| 5,937,697 A | * | 8/1999 | Matsufuji | 74/11 |
| 5,947,218 A | * | 9/1999 | Ishimaru | 180/53.1 |
| 6,038,840 A | * | 3/2000 | Ishimori et al. | 56/13.3 |
| 6,318,485 B1 | * | 11/2001 | Osuga et al. | 180/53.1 X |
| 2002/0011375 A1 | | 1/2002 | Ishimori et al. | |

FOREIGN PATENT DOCUMENTS

JP 61-142530 2/1985

* cited by examiner

Primary Examiner—Brian L. Johnson
Assistant Examiner—Bryan Fischmann
(74) Attorney, Agent, or Firm—Webb Ziesenheim Logsdon Orkin & Hanson, P.C.

(57) ABSTRACT

A working vehicle having a propelling transmission for transmitting power of an engine drive wheels, the propelling transmission being attached to body frames as offset to one side transversely of a vehicle body to produce a utility space in the other side, with a PTO apparatus for transmitting power supplied from the propelling transmission to an external working implement. The PTO apparatus includes an input shaft extending longitudinally of the vehicle body and drivably connected to the propelling transmission, and an output shaft extending parallel to and spaced from the input shaft and drivingly connected to the external working implement. A mounting mechanism system is provided to attach the PTO apparatus to vehicle body frames. The mounting mechanism system selectivety fixes the PTO apparatus in at least two pivotal postures about the input shaft.

5 Claims, 10 Drawing Sheets

WORKING VEHICLE WITH A PTO APPARATUS

BACKGROUND OF THE INVENTION

1. Field of the Invention

This invention relates to a working vehicle having a propelling transmission for transmitting power of an engine to drive wheels, the propelling transmission being attached to body frames as offset to one side transversely of a vehicle body to produce a utility space in the other side, with a power take-off (PTO) apparatus for transmitting power supplied from the propelling transmission to an external working implement.

2. Description of the Related Art

The above working vehicle, when an external working implement such as a rotary plow is connected to the rear of the vehicle body, transmits power supplied from the propelling transmission to the external working implement through the PTO apparatus.

A tractor which is a typical example of working vehicle may be used as a cultivating machine with a rotary plow connected to the rear of a tractor body. Alternatively, the tractor may be used as a grass cutting machine or a dust collecting machine with a mower unit or a dust collector connected to the vehicle body between front and rear wheels, and a grass catcher or a dust catcher attached to the rear of the vehicle body. A receiving portion of the grass catcher or dust catcher is connected to a discharge portion of the mower unit or dust collector through a transmitting duct. A blower is driven to transmit grass clippings or dust to the grass catcher or dust catcher.

When the tractor is constructed to act as a cultivating machine, a power transmission line from the propelling transmission through the PTO apparatus to the rotary plow tends to bend to a great extent three-dimensionally with the rotary plow moving up and down. As a result, transmission noise tends to be generated from connections in the power transmission line.

When the tractor is constructed to act as a grass cutting machine or dust collecting machine, the transmitting duct usually extends from the mower unit or dust collector outwardly of the tractor body from between the front and rear wheels and to the grass catcher or dust catcher. Thus, the transmitting duct provides an elongated transmission path with many bends. This results in grass or dust transmitting difficulties and enlarged transverse dimensions of the tractor body to encumber driving.

SUMMARY OF THE INVENTION

The object of this invention is to provide a working vehicle free from inconveniences in power transmission or grass or dust transmission when converted to a cultivating machine with an external working implement such as a plowing implement attached, or when converted to a grass cutting or dust collecting machine with an external working implement such as a mower unit or dust collector attached.

The above object is fulfilled, according to this invention, by a working vehicle having a propelling transmission as set forth at the outset hereof, comprising a PTO apparatus for transmitting power supplied from the propelling transmission to an external working implement, the PTO apparatus includes an input shaft extending longitudinally of the vehicle body and drivably connected to the propelling transmission, and an output shaft extending parallel to and spaced from the input shaft and drivingly connected to the external working implement; and a mounting mechanism system for attaching the PTO apparatus to vehicle body frames, the mounting mechanism system selectively fixing the PTO apparatus in at least two pivotal postures about the input shaft.

With this construction, an optimal position may be selected for the output shaft of the PTO apparatus according to an external working implement to be attached. Moreover, since the position of the input shaft is unchanged, a construction is employed to turn the PTO apparatus about the input shaft, which realizes a simplified mounting mechanism system.

In a preferred embodiment of this invention, the mounting mechanism system includes a first mounting mechanism and a second mounting mechanism, each mounting mechanism including a support platform for detachably attaching the PTO apparatus, and a mounting base connected to the support platform and detachably attached to the vehicle body frames. The PTO apparatus may be fixed reliably by using a support platform suitable to each different pivotal posture of the PTO apparatus. As a particularly preferred embodiment, the support platform may include a first support plate for supporting the PTO apparatus with the output shaft offset to the one side transversely of the vehicle body, and a second support plate for supporting the PTO apparatus with the output shaft in a substantially middle position transversely of the vehicle body. This construction provides two typical positions of the output shaft in a simple way.

In another preferred embodiment of this invention, when the PTO apparatus is attached to the vehicle body frames by using the first support plate, the PTO apparatus as a whole is disposed in the side to which the propelling transmission is offset, a dust transmitting duct extending longitudinally of the vehicle body through the utility space. In this construction, the PTO apparatus is offset to the same side to which the propelling transmission is offset, to produce a sufficient space between one of the right and left rear wheels and the power takeoff apparatus to accommodate the dust transmitting duct. Thus, when the working vehicle is converted to a grass cutting machine or a dust collecting machine, the transmitting duct extending between the right and left rear wheels can quickly and efficiently transmit grass clippings or dust to a grass catcher or a dust catcher. The machine is easy to drive since the overall transverse dimensions are not increased.

In a further preferred embodiment of this invention, when the PTO apparatus is attached to the vehicle body frames by using the second support plate, a power transmission line extends substantially linearly with respect to a transverse direction of the vehicle body, from the output shaft of the PTO apparatus to a plowing implement acting as the external working implement. With this construction, considering that the plowing implement apparatus usually has a power input portion thereof located in the middle position, no great three-dimensional bending occurs with the power transmission line from the output shaft of the PTO apparatus to the plowing implement. Consequently, when the working vehicle is converted to a cultivating machine, connections in the power transmission line are bent to a less degree, thereby hardly producing transmission noise, even when the plowing implement moves up and down.

Other features and advantages of this invention will be apparent from the following description of the embodiment to be taken with reference to the drawings.

DESCRIPTION OF THE PREFERRED EMBODIMENT

Figure 1:
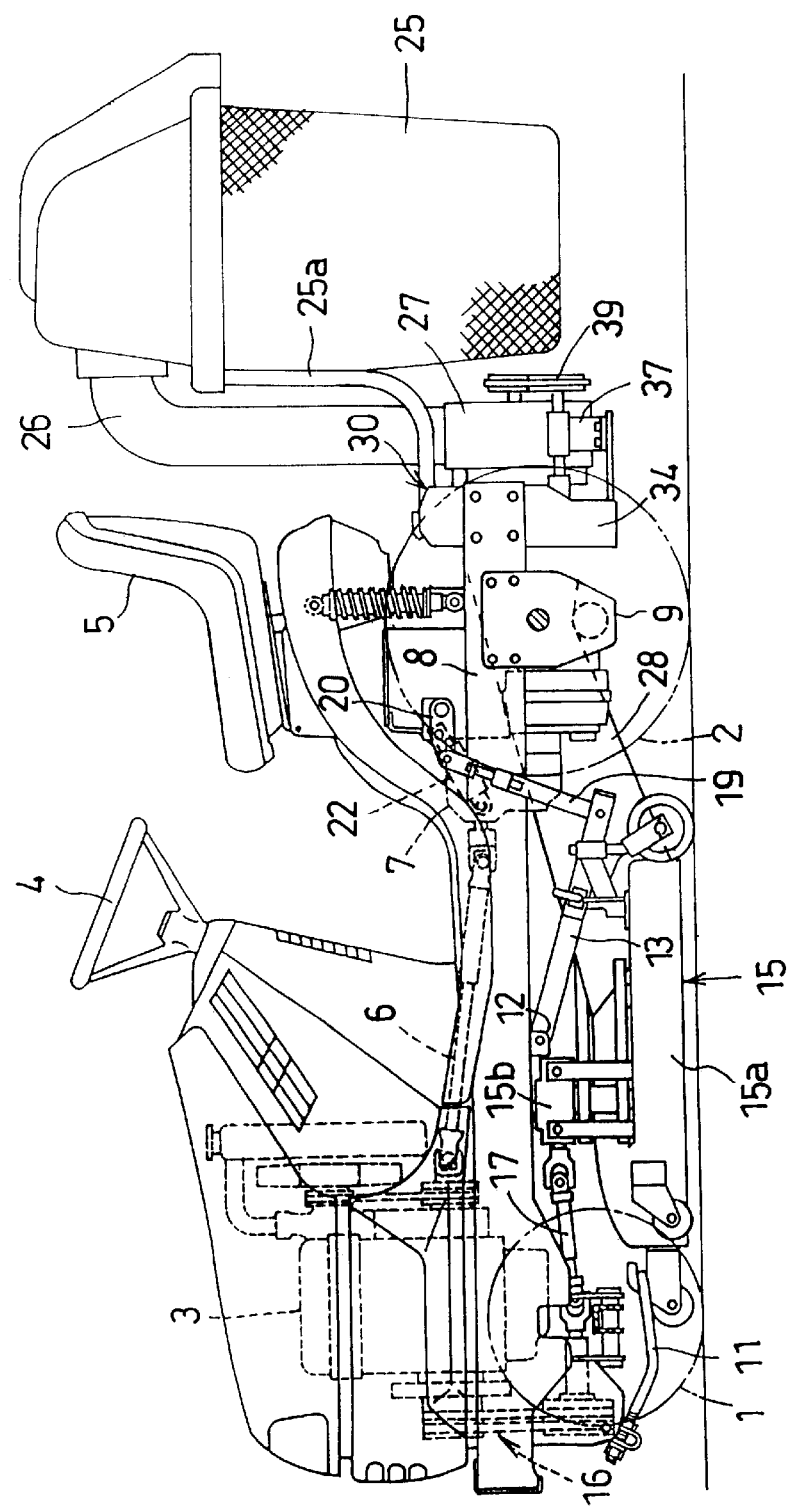
FIG. 1 is a side elevation of a riding lawn mower.

As shown in FIG. 1, a riding tractor, which is one example of working vehicle, includes a pair of right and left, freely rotatable and dirigible front wheels 1 and a pair of right and left rear drive wheels 2 supporting a vehicle body. A motor section having an engine 3 is disposed on a front portion of the vehicle body. Rearwardly of the motor section is a driving platform including a steering wheel 4 for steering the front wheels 1, and a driver's seat 5.

Figure 8:
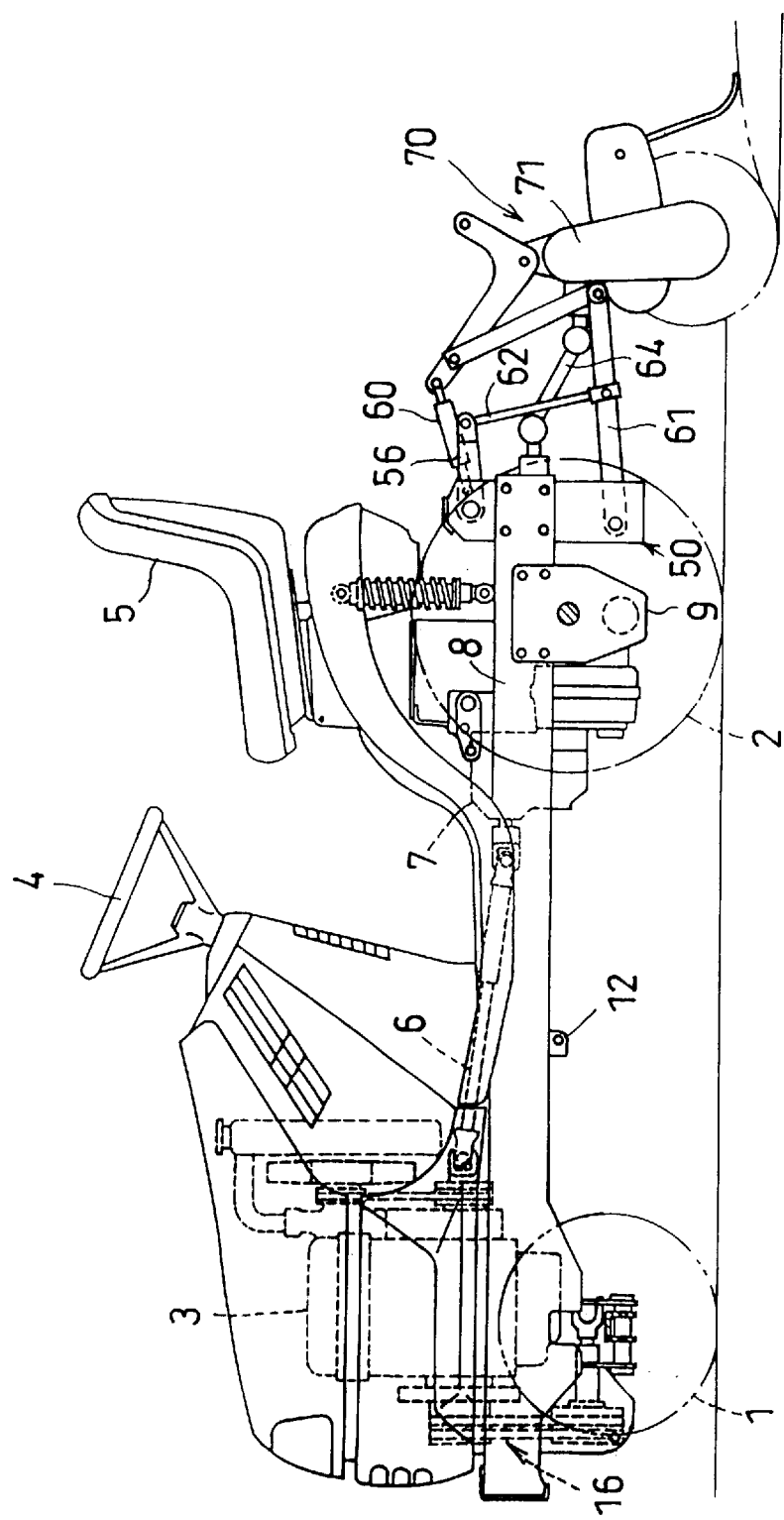
FIG. 8 is a side elevation of a riding cultivating machine.

This tractor may be converted to a riding grass cutting machine as shown in FIG. 1 and a riding rotary cultivating machine as shown in FIG. 8.

Figure 2:
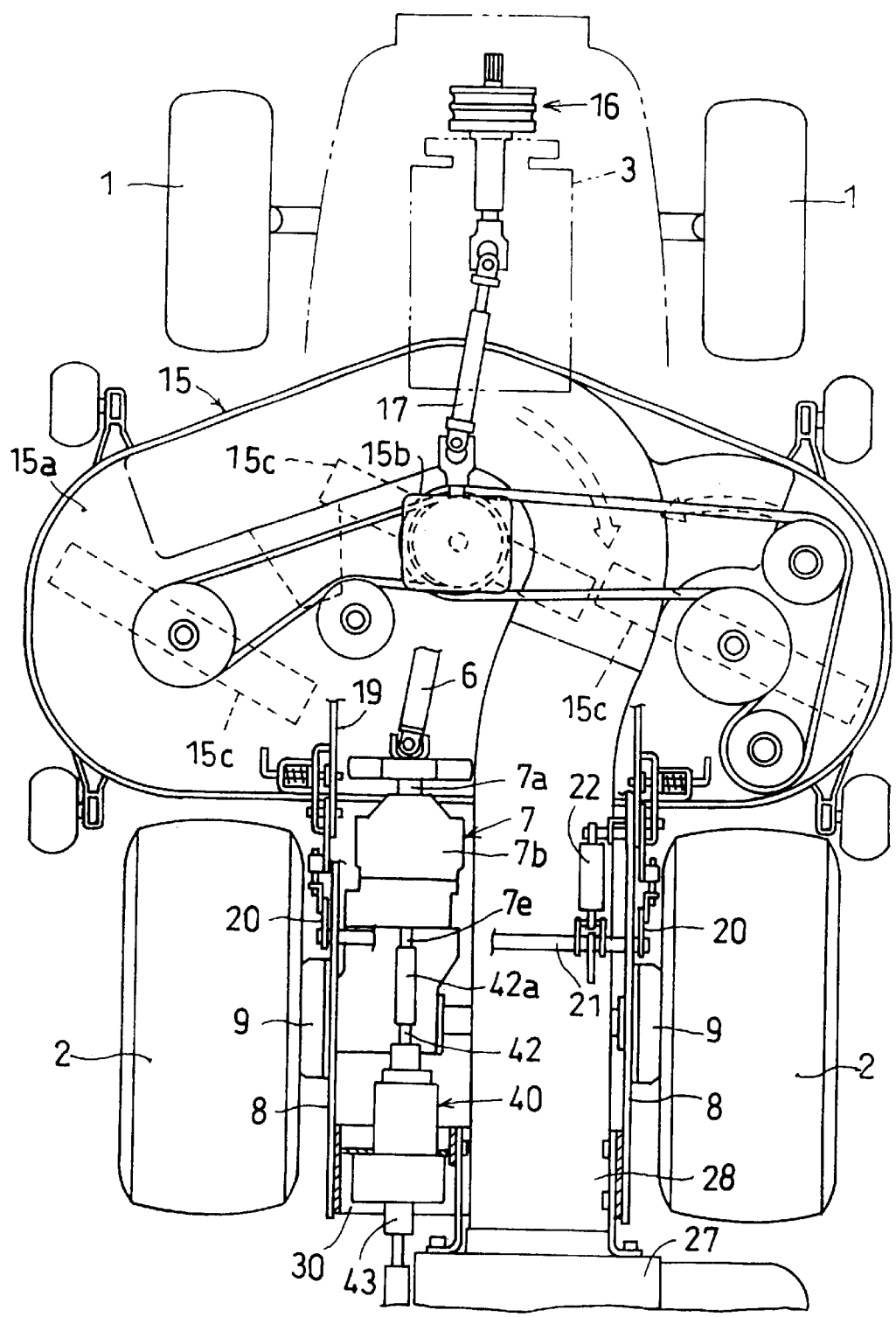
FIG. 2 is a plan view of a rear portion of the lawn mower.
Figure 3:
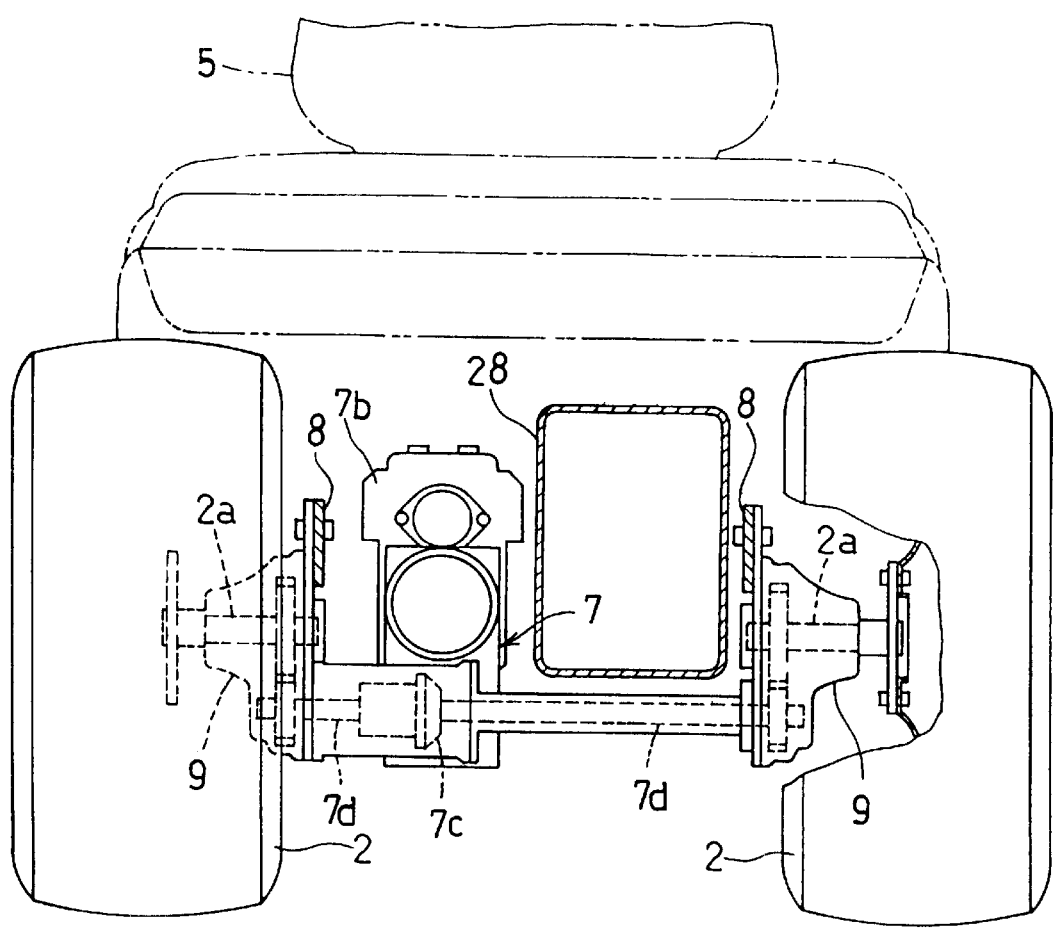
FIG. 3 is a rear view of the lawn mower.

As shown in FIGS. 1, 2 and 3, the engine 3 is disposed between the right and left front wheels 1, and a propelling transmission 7 is disposed between the right and left rear wheel 2. Both the engine 3 and propelling transmission 7 are disposed between a pair of right and left body frames 8 and supported by the body frames 8. The propelling transmission 7 is offset toward one of the rear wheels 2. An output shaft at the rear end of engine 3 is connected to an input shaft 7a of propelling transmission 7 through a rotary transmission shaft 6.

The propelling transmission 7 includes a hydraulic stepless transmission 7b having a hydraulic pump driven by the input shaft 7a and a hydraulic motor driven by the hydraulic pump. The propelling transmission 7 transmits torque output of stepless transmission 7b through right and left output shafts 7d of a rear differential mechanism 7c to gear transmission mechanisms in rear wheel drive cases 9. The gear transmission mechanisms transmit the power to rear axles 2a disposed above. That is, the stepless transmission 7b switches torque received from the engine 3 to forward drive or backward drive, and steplessly changes the speed of forward drive or backward drive. The drive is then transmitted through the output shafts 7d of rear differential mechanism 7c to the right and left rear axles 2a to drive the right and left rear wheels 2.

A power supply shaft 7e projects rearward from a casing of stepless transmission 7b of input shaft 7a to act as a power supply portion to drive an external working implement.

The tractor converted to a grass cutting machine is shown in FIGS. 1 through 7. As shown in FIGS. 1, 2 and so on, a mower unit 15 is vertically movably connected to the vehicle body between the front and rear wheels through a link mechanism including front pivot links 11 having forward ends thereof pivotally connected to support elements arranged at front end positions of the vehicle body, and rear pivot links 13 having forward ends thereof pivotally connected to link brackets 12 fixed to right and left body frames 8 between the front and rear wheels. Torque of an output shaft at the front of engine 3 is transmitted to an input case 15b on the upper surface of a mower deck 15a of mower unit 15 through a belt type transmission mechanism 16 and a rotary shaft 17.

As shown in FIGS. 1, 2 and so on, lift arms 20 are connected to the rear end of rear pivot links 13 through suspender rods 19. A lift arm 20 is connected to the rear end of left pivot link 13 through a suspender rod 19, and a lift arm 20 is connected to the rear end of right pivot link 13 through a suspender rod 19. The lift arms 20 are interconnected by a rotatable lift arm support shaft 21 extending between the right and left body frames 8. To this lift arm support shaft 21 is connected, through a swing arm, a piston of a lift cylinder 22 having a tube end supported by one of the body frames 8. The lift cylinder 22 rotates the lift arm support shaft 21 to swing the right and left lift arms 20 up and down. The right and left rear pivot links 13 are thereby swung up and down relative to the body frames 8 to raise and lower the mower unit 15.

As shown in FIGS. 2 through 6, a grass catcher 25 is attached to the rear of the vehicle body, and a lifting device 26 is provided which has an upper end thereof connected to a receiving portion of grass catcher 25, and a lower end having a collecting blower 27. The collecting blower 27 is connected through a transmitting duct 28 to a grass discharge portion of mower deck 15a of mower unit 15. Power is transmitted from the power supply shaft 7e of propelling transmission 7 to the collecting blower 27. The mower unit 15 cuts grass with a plurality of cutting blades 15c rotating in the mower deck 15a and feeds grass clippings into the transmitting duct 28 along with air flows generated by the rotation of cutting blades 15c. The grass clippings move through the transmitting duct 28 and lifting device 26 to the grass catcher 25 to accumulate in the grass catcher 25.

Figure 5:
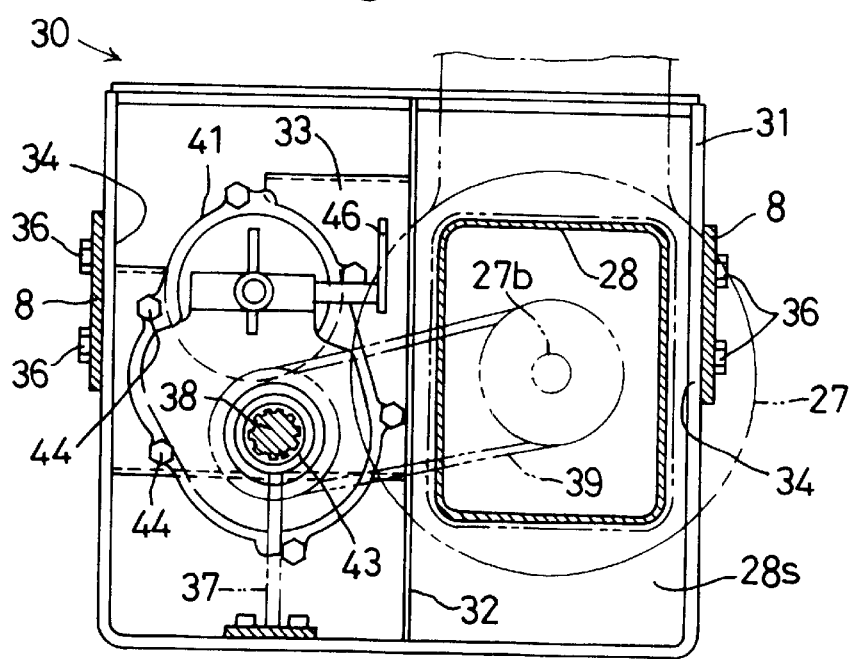
FIG. 5 is a rear view of the power takeoff portion.
Figure 6:
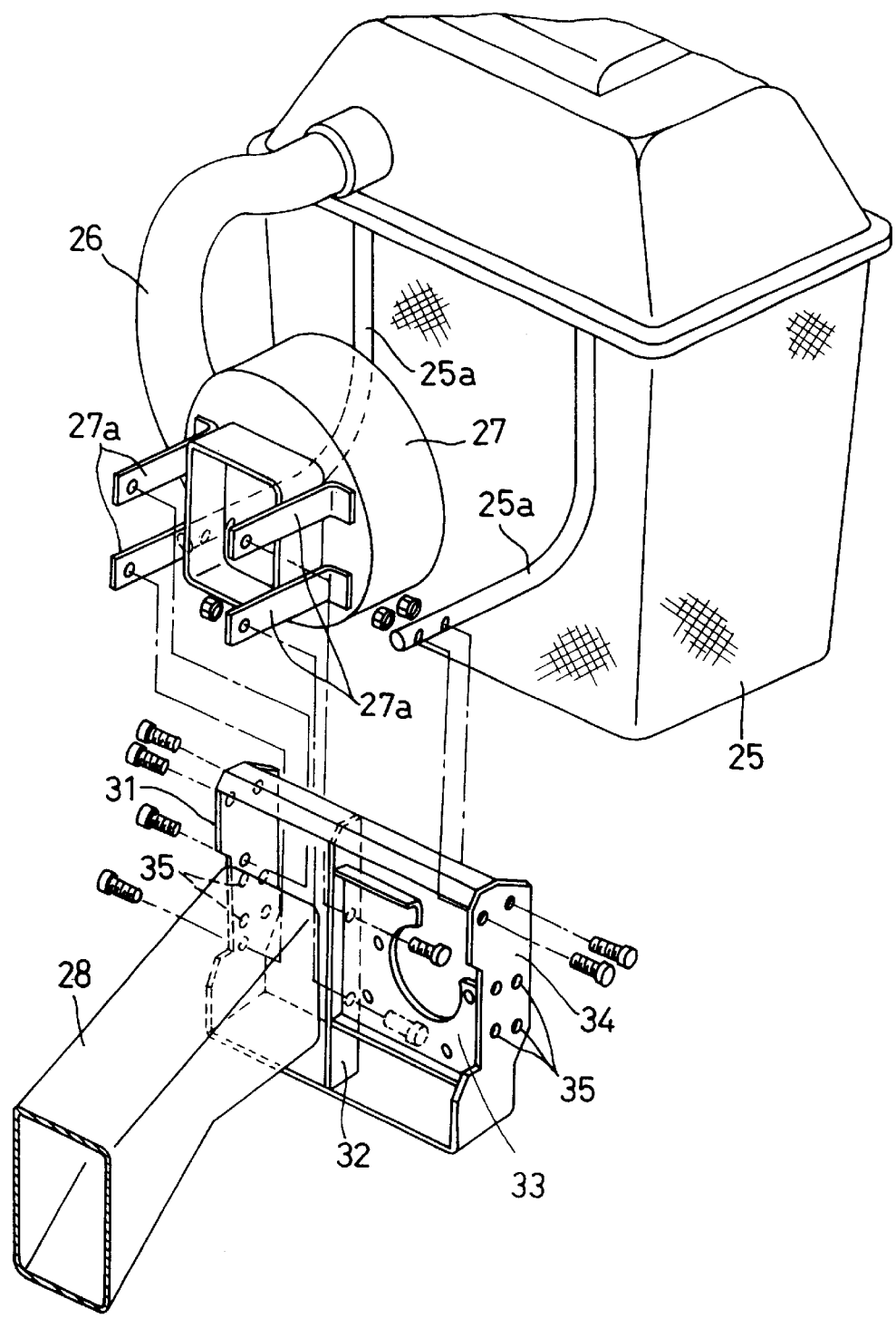
FIG. 6 is a perspective view of a mounting member and a grass catcher of the lawn mower.

As shown in FIGS. 5, 6 and so on, a first mounting mechanism (mounting mechanism for the grass cutting machine) 30 includes an outer frame 31 formed of sheet metal members combined into a rectangular shape, seen in the fore and aft direction of the vehicle body, a vertical frame member 32 disposed inside the outer frame 31 and interconnecting middle positions of an upper frame portion and a lower frame portion of outer frame 31, and a support plate 33 acting as a support platform formed of a sheet metal member extending between the vertical frame member 32 and a side frame portion of outer frame 31. The outer frame 31 has opposite side plates acting as mounting bases 34 for connecting the first mounting mechanism 30 to the body frames 8. Both right and left mounting bases 34 are detachably connected to the body frames 8 by connecting bolts 36 attached to the outer frame 31 and body frames 8 through a plurality of bolt holes 35 formed in the mounting bases 34.

That is, when converting the tractor to the grass cutting machine, as shown in FIGS. 1, 2, 4, and 6, the first mounting mechanism 30 is detachably attached, through the mounting bases 34 at the opposite sides of outer frame 31, to inward surfaces adjacent the rear ends of right and left body frames 8. The grass catcher 25 is supported by the vehicle body, with right and left support rods 25a of grass catcher 25 connected to the outer frame 31 of first mounting mechanism 30. The lower end portion of lifting device 26 is supported by the vehicle body, with support rods 27a extending from a blower case of lifting device 26 being connected to the outer frame 31 and vertical frame member 32 of first mounting mechanism 30.

Figure 4:
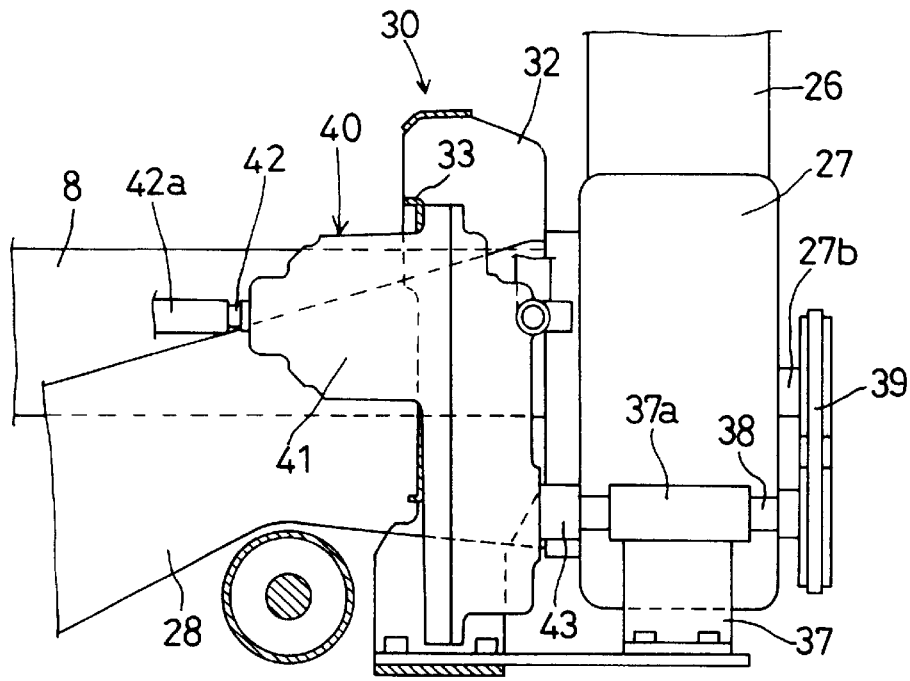
FIG. 4 is a side view of a power takeoff portion of the lawn mower.

As shown in FIGS. 2, 4 and 5, a power takeoff (PTO) apparatus 40 includes an input shaft 42 projecting from one end of a power takeoff (PTO) case 41, and a tubular power takeoff (PTO) shaft 43 projecting in the opposite direction from the other end. The power takeoff apparatus 40 is detachably fixed to the support plate 33 by fastening the power takeoff case 41 of power takeoff apparatus 40 to the support plate 33 with a plurality of mounting bolts 44 acting also to fastening a front surface and a rear surface of power takeoff case 41 together. As a result, a power transmission line from the power supply shaft 7e of propelling transmission 7 extends to the collecting blower 27 while being offset to one side transversely of the vehicle body between the right and left rear wheels 2. A space 28S is formed in the other side transversely of the vehicle body between the right and left rear wheels 2 for accommodating the transmitting duct 28.

Figure 7:
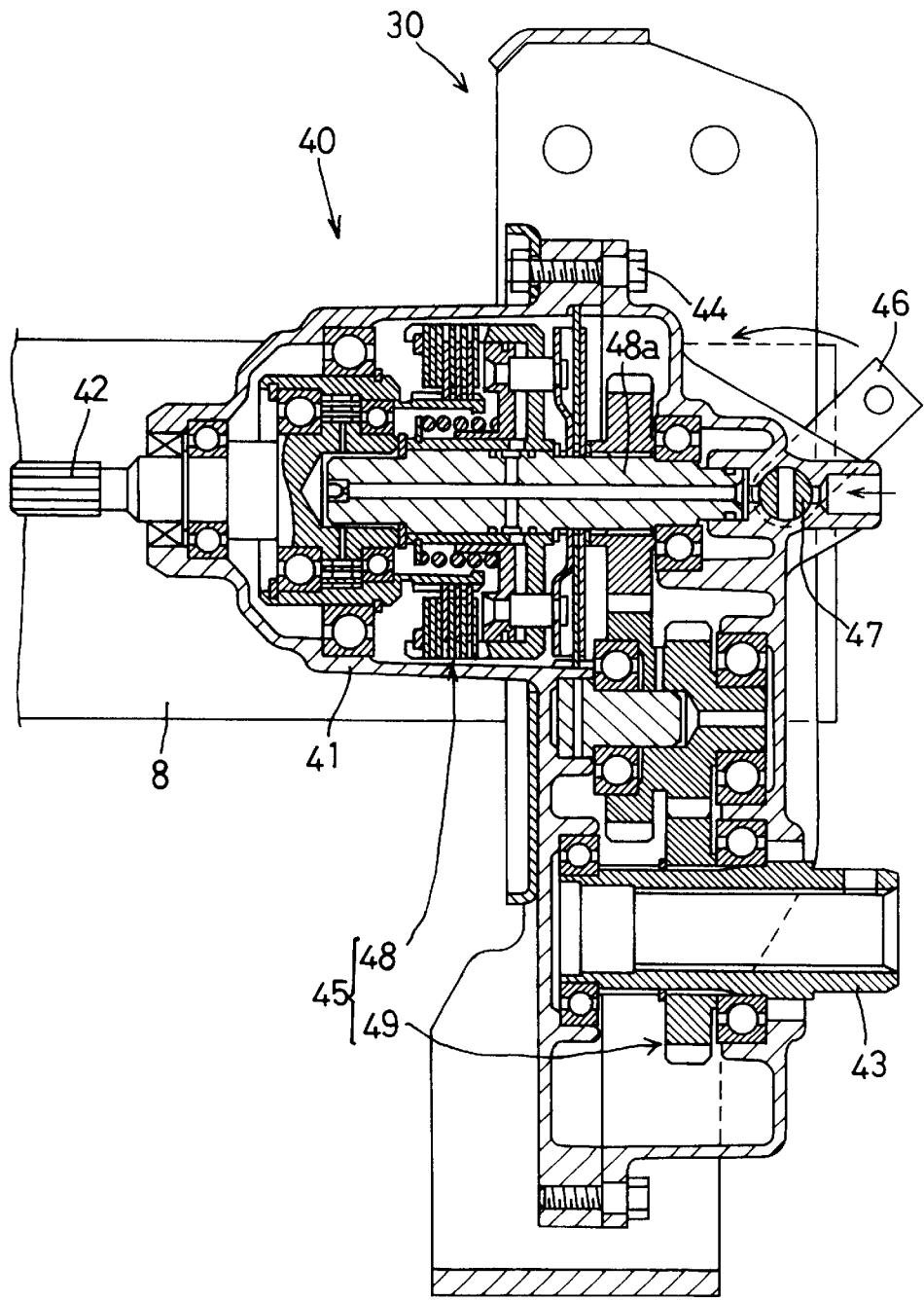
FIG. 7 is a side view in vertical section of a power takeoff apparatus.

As shown in FIG. 7, the power takeoff apparatus 40 includes the power takeoff case 41 having the input shaft 42 and power takeoff shaft 43, and a transmission control mechanism 45 disposed in the power takeoff case 41 for interlocking the input shaft 42 to the power takeoff shaft 43. The transmission control mechanism 45 includes a hydraulically operable clutch mechanism 48 switchable between an engaged position and a disengaged position by a clutch lever 46 pivotably attached to a rear of the portion of power takeoff case 41 having the input shaft 42 to switch a valve 47, and a gear transmission mechanism 49 having a plurality of transmission gears for decelerating torque of an output shaft 48a of clutch mechanism 48 for transmission to the power takeoff shaft 43.

When the power takeoff apparatus 40 is supported by the support plate 33, the entire power takeoff apparatus 40 is offset transversely of the vehicle body toward where the propelling transmission 7 is disposed, by the positioning action of first mounting mechanism 30. A utility space 28S is formed between the power takeoff apparatus 40 and one of the rear wheels 2 to accommodate the transmitting duct 28. Consequently, the transmitting duct 28 may be disposed to extend through the space 28S between the right and left rear wheels 2 to connect the mowing device 15 and lifting device 26.

As seen from FIG. 2, when the power takeoff apparatus 40 is supported by the support platform (i.e. support plate 33), the input shaft 42 of power takeoff apparatus 40 projects forward from the power takeoff case 41 to be placed rearwardly of and coaxial with the power supply shaft 7e of propelling transmission 7 by the positioning action of the first mounting mechanism 30. The power supply portion 7e and input shaft 42 are connected to each other to be separable and rotatable together by counting 42a. This coupling has a forward end thereof fitted on to the power supply shaft 7e to be separable and rotatable together through a spline engagement, and a rear end fitted on the input shaft 42 to be separable and rotatable together through a spline engagement. The power takeoff shaft 43 is disposed rearwardly of the propelling transmission 7 and offset to one side from the middle position transversely of the vehicle body, and projects rearward from the power takeoff case 41. As a result, as shown in FIG. 4, the rear end of a rotary transmission shaft 38 rotatably supported by a boss 37a of a support 37 extending from the outer frame 31 of first mounting mechanism 30 and having a forward end connected to the power takeoff shaft 43 through a spline engagement to be rotatable together is drivingly interlocked by a transmission belt 39 to a blower drive shaft 27b projecting rearward from the blower case collecting blower 27. The power of power supply shaft 7e of propelling transmission 7 is transmitted by the power takeoff apparatus 40 laterally of the transmitting duct 28 rearwardly of the vehicle body, and transmitted from the power takeoff shaft 43 of power takeoff apparatus 40 to the blower drive shaft 27b to drive the collecting blower 27.

FIG. 8 shows the tractor converted to a cultivating machine. In the cultivating machine, as shown in FIGS. 9 through 12, a second mounting mechanism 50 includes an outer frame 51 formed of sheet metal members combined into a rectangular shape, seen in the fore and aft direction of the vehicle body, a vertical frame member 52 disposed inside the outer frame 51 and interconnecting end positions of an upper frame portion and a lower frame portion, and a second support plate 53 acting as a support platform formed of a sheet metal member extending between the vertical frame member 52 and a side frame portion of outer frame 51. The second mounting mechanism 50 has a top link bracket 54 attached to an middle inward surface of the upper frame portion of outer frame 51, and a lift arm support shaft 55 rotatably supported by upper ends of right and left side frame portions of outer frame 51. Proximal ends of lift arms 56 are rigidly connected to opposite ends of the lift arm support shaft 55. Lower link support shafts 57 are attached to inward surfaces at lower ends of right and left side frame portions of outer frame 51. The two side plates of outer frame 51 act as mounting bases 58 for connecting the second mounting mechanisms 50 to the body frames 8. Both right and left mounting bases 58 are detachably connected to the body frames 8 by the connecting bolts 36 attached to the outer frame 51 and body frames 8 through a plurality of bolt holes 58a formed in the mounting bases 34.

Figure 9:
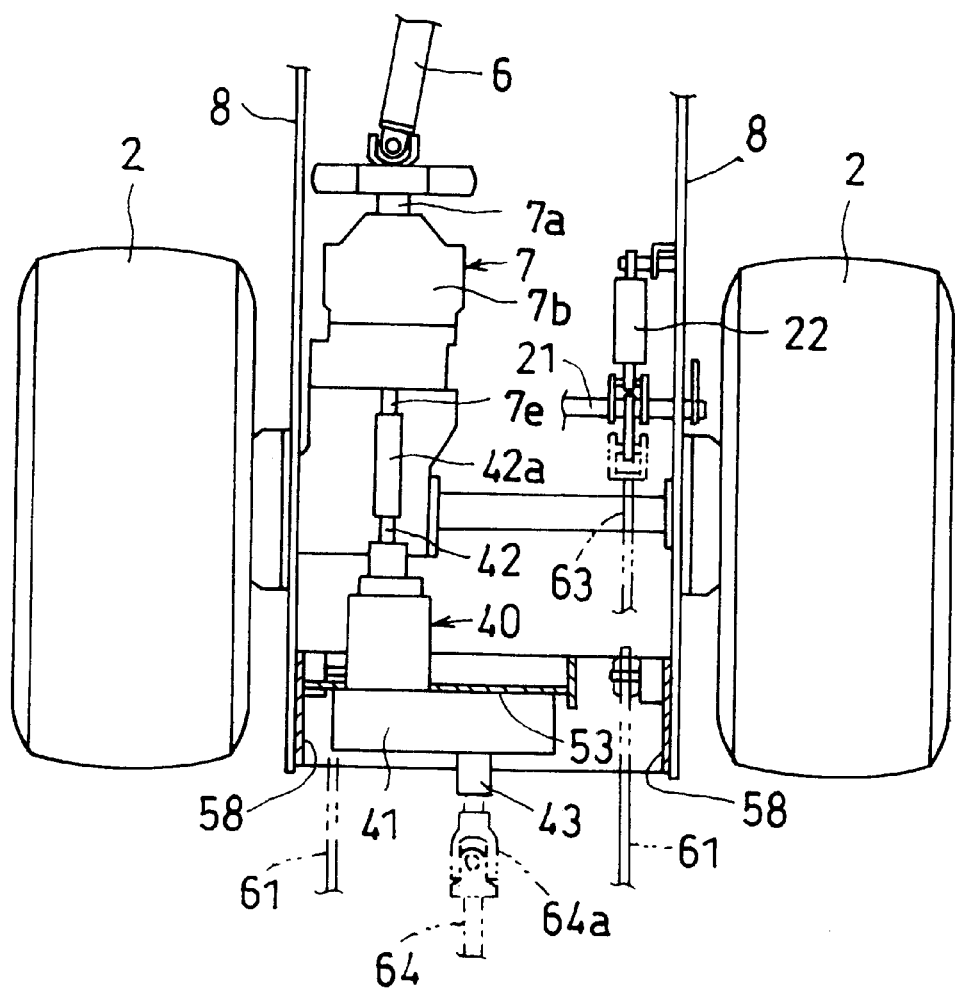
FIG. 9 is a plan view of a power takeoff portion of the cultivating machine.
Figure 10:
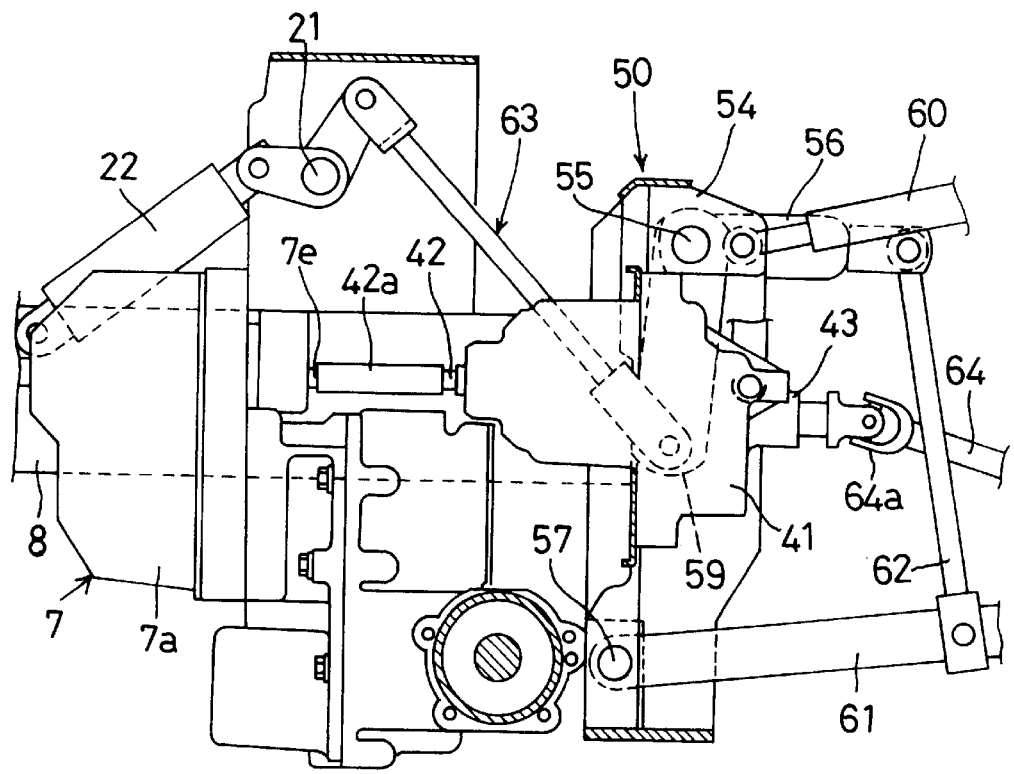
FIG. 10 is a side view of the power takeoff portion of the cultivating machine.
Figure 11:
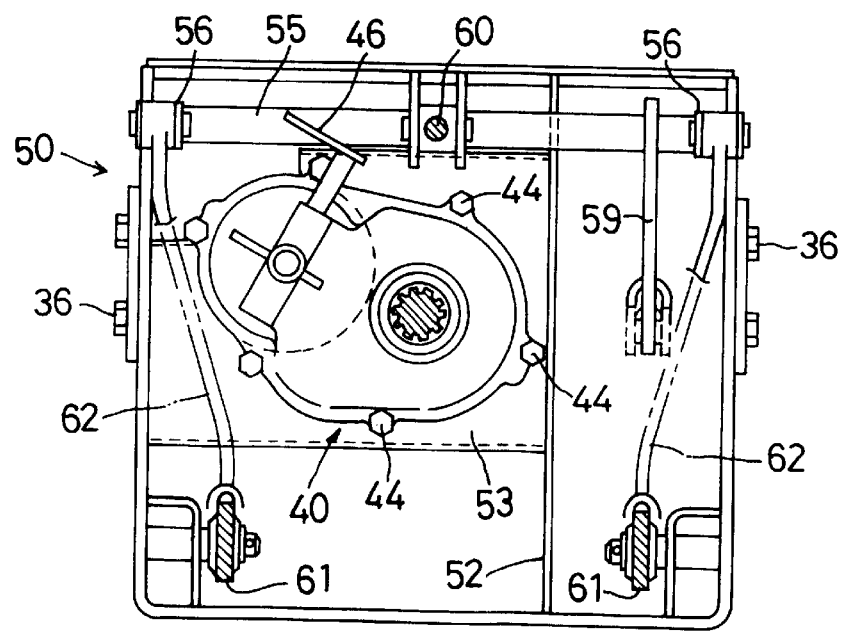
FIG. 11 is a rear view of the power takeoff portion of the cultivating machine.
Figure 12:
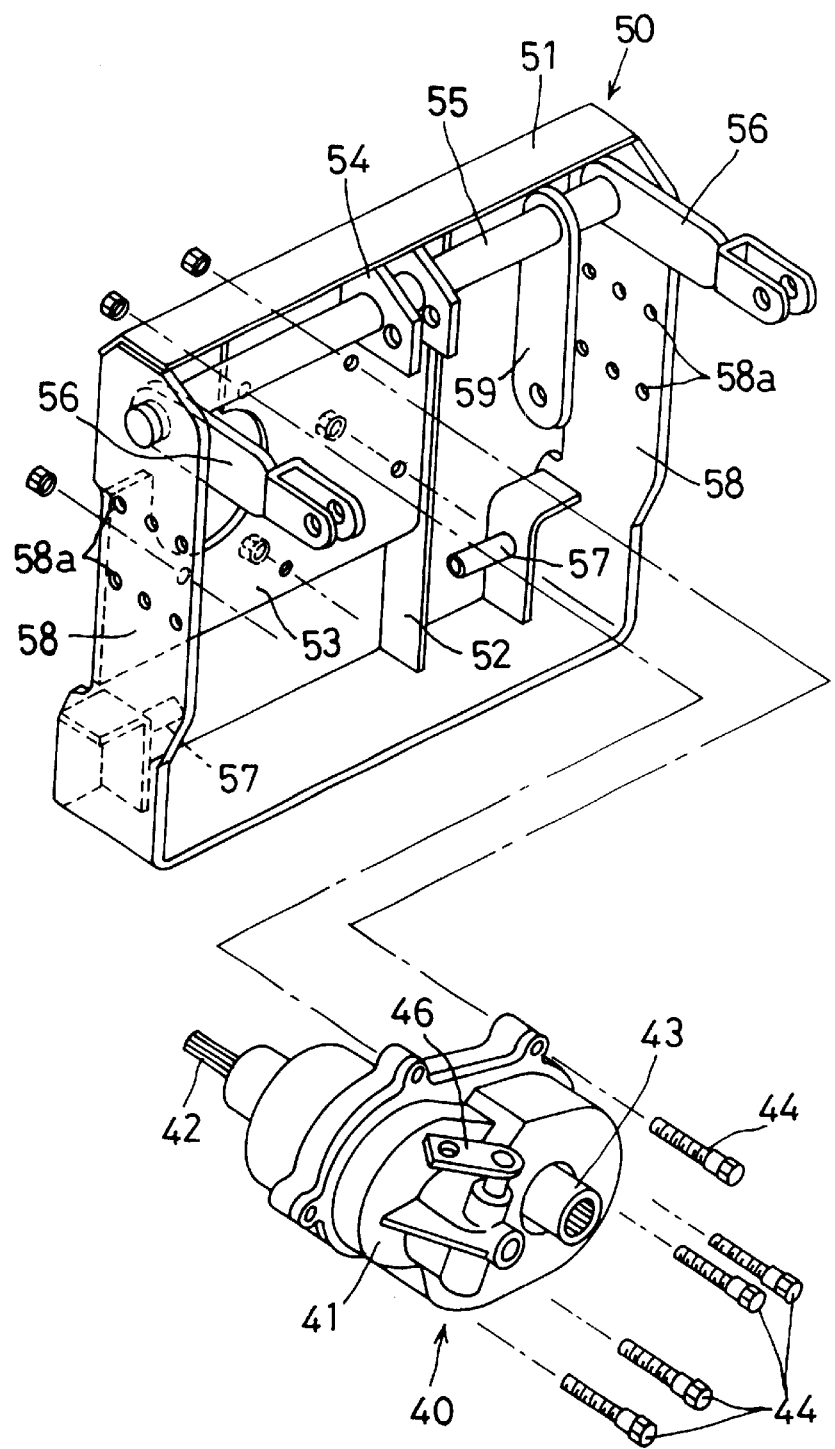
FIG. 12 is a perspective view of a mounting member of the cultivating machine.

As shown in FIGS. 8, 9, and 10, the second mounting mechanism 50 is detachably attached, through the mounting bases 58 of outer frame 51, to inward surfaces adjacent the rear ends of right and left body frames 8 from which the first mounting mechanism 30 has been detached. The second mounting mechanism 50 has, arranged therein the top link bracket 54, the pair of right and left lift arms 56 and the pair of right and left lower link support shafts 57. A top link 60 having a forward end thereof pivotally connected to the top link bracket 54, and the pair of right and left lower links 61 having forward ends thereof pivotally connected to the right and left lower link support shafts 57, are pivotally connected at lower ends thereof to frames 71 of a rotary plow 70, respectively. Lift rods 62 are connected between the right and left lift arms 56 and lower links 61, respectively. These components constitute a link mechanism for vertically movably connecting the rotary plow to the vehicle body.

As shown in FIG. 10, the lift arm support shaft 21 of the link mechanism for raising and lowering the mower unit 15 is connected through a link mechanism 63 to a control arm 59 attached to one end of lift arm support shaft 55. When the lift arm support shaft 55 is rotated by the lift cylinder 22, the right and left lift arms 56 are swung vertically to swing the right and left lower links 61 vertically relative to the body frames 8, thereby vertically moving the plowing implement 70.

As shown in FIGS. 8, 9, 10 and so on, the power takeoff apparatus 40 is detachably supported by the support platform of the second mounting mechanism 50 by tightening the mounting bolts 44 to connect the power takeoff case 41 of power takeoff apparatus 40 separated from the first mounting mechanism 30 to the rear surface of support platform of the second mounting mechanism 50. Then, a power transmission line is produced for transmitting power from the power supply shaft 7e of propelling transmission 7 to the plowing implement 70 through the power takeoff shaft 43 disposed by the power takeoff apparatus 40 in the rear middle position transversely of vehicle body, and through a rotary shaft 64.

That is, as shown in FIGS. 8, 9, 10 and so on, when the power takeoff apparatus 40 is supported by the support platform (i.e. support plate 53), the input shaft 42 of power takeoff apparatus 40 projects forward from the power takeoff case 41 to be placed rearwardly of and coaxial with the power supply shaft 7e of propelling transmission 7 by the positioning action of the second mounting mechanism 50. The input shaft 42 is connected to the power supply shaft 7e to be separable and rotatable together by the coupling 42a. the power takeoff shaft 43 is disposed rearwardly of the propelling transmission 7 and in the middle position transversely of the vehicle body, and projects rearward from the power takeoff case 41. The power takeoff shaft 43 is connected to an input shaft of plowing implement 70 through the rotary shaft 64 with as 64 universal joint 64a disposed in between. The torque of power supply shaft 7e of propelling transmission 7 may be taken out by the power takeoff apparatus 40 in the middle position transversely of the vehicle body. The power is transmitted from the power takeoff shaft 43 of power takeoff apparatus 40 through the rotary shaft 64 to the plowing implement 70 to drive tillage tines. The power transmission line from the power take off shaft 43 through the rotary shaft 64 to the plowing implement 70 extends linearly in the fore and aft direction of the vehicle body in plan view.

According to the invention, the tractor may be converted not only to a grass cutting machine and a rotary cultivating machine, but also to a dust collecting machine with a dust collector attached to the vehicle body between the front and rear wheels, and a dust catcher disposed at the rear of the vehicle body to receive and store dust collector.

According to the invention, it is understood that the first mounting mechanism 30 and the second mounting mechanism 50 combine to create the overall mounting mechanism system of the present invention.

What is claimed is:

1. A working vehicle having a propelling transmission for transmitting power of an engine to drive wheels, the propelling transmission being attached to body frames as offset to one side of a longitudinal center line of a vehicle body in a direction transversely of the vehicle body to produce a utility space in the other side, with a PTO apparatus for transmitting power supplied from the propelling transmission to an external working implement, said working vehicle comprising:

a PTO apparatus for transmitting power supplied from said propelling transmission to an external working implement, said PTO apparatus includes an input shaft extending longitudinally of said vehicle body and drivably connected to said propelling transmission, and an output shaft extending parallel to and spaced from said input shaft and drivingly connected to said external working implement; and a mounting mechanism system for attaching said PTO apparatus to vehicle body frames, said mounting mechanism system selectively fixing said PTO apparatus in at least two pivotal postures about said input shaft.

2. A working vehicle as defined in claim 1, wherein said mounting mechanism system includes a first mounting mechanism and a second mounting mechanism, each mounting mechanism having a support platform for detachably attaching said PTO apparatus, and a mounting base connected to said support platform and detachably attached to said vehicle body frames.

3. A working vehicle as defined in claim 2, wherein at least one support platform includes a first support plate for supporting said PTO apparatus with said output shaft offset to said one side transversely of said vehicle body, and a second support plate for supporting said PTO apparatus with said output shaft in a substantially middle position transversely of said vehicle body.

4. A working vehicle as defined in claim 3, wherein, when said PTO apparatus is attached to the vehicle body frames by using said first support plate, said PTO apparatus as a whole is disposed in the side to which said propelling transmission is offset, a dust transmitting duct extending longitudinally of the vehicle body through said utility space.

5. A working vehicle as defined in claim 3, wherein, when said PTO apparatus is attached to the vehicle body frames by using said second support plate, a power transmission line extends substantially linearly with respect to a tranverse direction of the vehicle body, from said output shaft of said PTO apparatus to plowing implement acting as said external working implement.

* * * * *

UNITED STATES PATENT AND TRADEMARK OFFICE
CERTIFICATE OF CORRECTION

PATENT NO.    : 6,454,041 B2
DATED         : September 24, 2002
INVENTOR(S)   : Shoso Ishimori et al.

It is certified that error appears in the above-identified patent and that said Letters Patent is hereby corrected as shown below:

<u>Column 4,</u>
Lines 23-24, "raise and lower" should read -- raise or lower --.

<u>Column 5,</u>
Line 53, "by counting" should read -- by a coupling --.

<u>Column 7,</u>
Lines 15-16, "42a. the" should read -- 42a. The --.
Line 21, "with as 64 universal joint 64a" should read -- with a universal joint 64a --.
Line 32, "the invention" should read -- this invention --.
Line 37, "store dust collector" should read -- store dust from the dust collector --.

Signed and Sealed this

Eighteenth Day of February, 2003

JAMES E. ROGAN
*Director of the United States Patent and Trademark Office*